United States Patent
Kagami et al.

(10) Patent No.: US 8,216,733 B2
(45) Date of Patent: Jul. 10, 2012

(54) FUEL CELL SYSTEM

(75) Inventors: Fumio Kagami, Yokosuka (JP); Kazuya Tajiri, State College, PA (US)

(73) Assignee: Nissan Motor Co., Ltd., Yokohama-shi (JP)

( * ) Notice: Subject to any disclaimer, the term of this patent is extended or adjusted under 35 U.S.C. 154(b) by 1491 days.

(21) Appl. No.: 10/579,908

(22) PCT Filed: Oct. 15, 2004

(86) PCT No.: PCT/JP2004/015661
§ 371 (c)(1),
(2), (4) Date: Jul. 14, 2006

(87) PCT Pub. No.: WO2005/050767
PCT Pub. Date: Jun. 2, 2005

(65) Prior Publication Data
US 2007/0042235 A1    Feb. 22, 2007

(30) Foreign Application Priority Data

Nov. 19, 2003    (JP) .................... P2003-389286

(51) Int. Cl.
*H01M 8/04*    (2006.01)
*H01M 8/24*    (2006.01)

(52) U.S. Cl. ........ 429/432; 429/431; 429/430; 429/429; 429/452; 429/471

(58) Field of Classification Search .................. 429/428, 429/432, 430, 431, 429, 452, 471
See application file for complete search history.

(56) References Cited

U.S. PATENT DOCUMENTS

| | | | |
|---|---|---|---|
| 5,085,949 A | 2/1992 | Sanderson et al. | |
| 6,294,277 B1 | 9/2001 | Ueno et al. | |
| 6,387,556 B1 | 5/2002 | Fuglevand et al. | |
| 6,428,917 B1 | 8/2002 | Lacy et al. | |
| 2001/0028967 A1* | 10/2001 | Roberts et al. ................. | 429/13 |
| 2002/0028362 A1 | 3/2002 | Prediger et al. | |
| 2002/0192520 A1* | 12/2002 | Nonobe ......................... | 429/23 |
| 2003/0207162 A1 | 11/2003 | Reiser | |
| 2004/0137293 A1 | 7/2004 | Nakanishi | |

FOREIGN PATENT DOCUMENTS

| | | |
|---|---|---|
| DE | 198 59 543 A1 | 6/1999 |
| DE | 100 65 446 A1 | 7/2001 |
| EP | 0 827 226 B1 | 3/1998 |
| JP | 4-315774 A | 11/1992 |
| JP | 6-223859 A | 8/1994 |
| JP | 8-315843 A | 11/1996 |
| JP | 9-312168 A | 12/1997 |
| JP | 2001-148253 A | 5/2001 |
| JP | 2002-319423 A | 10/2002 |
| JP | 2002-324563 A | 11/2002 |
| JP | 2003-036874 A | 2/2003 |

* cited by examiner

*Primary Examiner* — Helen O Conley (74) *Attorney, Agent, or Firm* — Foley & Lardner LLP (57) ABSTRACT

Voltage rising detection unit detects a voltage rising condition of a fuel cell stack after the supply of reactant gas to the fuel cell stack is started. A control unit determines an internal state of the fuel cell stack on the basis of the detected voltage rising condition of the fuel cell stack, and then decides a subsequent operation of the fuel cell stack in accordance with the determination. This makes it possible to minimize deterioration of the fuel cell stack which is caused by generating power continuously in an unsuitable state.

26 Claims, 6 Drawing Sheets

FUEL CELL SYSTEM

TECHNICAL FIELD

The present invention relates to a fuel cell system and, more particularly, to a technique for minimizing, deterioration of fuel cells caused by generating power continuously in an unsuitable condition.

BACKGROUND ART

Polymer electrolyte fuel cells, which are now being expected to serve as a power source for vehicles, have heretofore been known for their own disadvantages that, in a low temperature environment below freezing, moisture around electrodes is frozen which obstructs the diffusion of reactant gas and in turn decreases the electric conductivity of electrolyte membranes. Further, there is another disadvantage that upon activating a fuel cell in such a low-temperature environment, clogging occurs in reactant gas flow channels due to the moisture freezing and the reactant gas is obstructed from advancing to and reaching the electrolyte membranes, which sometimes retard an electrochemical reaction of the reactant gas even though being supplied and hence result in failure to start-up the fuel cell. Furthermore, frozen dew produced in the reactant gas flow channels may blockade gas flow paths.

In view of such backgrounds as the above, as disclosed in Japanese Patent Laid-Open No. 2003-36874, there, has been proposed a fuel cell system having detector for detecting internal temperate of a fuel cell to deactivate a cooling water pump when the internal temperature of the fuel cell is below freezing and to increase the driving amount of the cooling water pump in accordance with a rise in the internal temperature of the fuel cell when the internal temperature thereof is above freezing, in order to prevent generated water from freezing in the fuel cell.

DISCLOSURE OF THE INVENTION

According to conventional fuel cell systems such as the above mentioned, they are able to determine a state of a fuel cell during power generation and to optimize operative conditions corresponding to present state of the fuel cell, but are not able to determine a state of the fuel cell before starting the power generation. Therefore, the conventional fuel cell systems have suffered from deterioration of the fuel cell caused by generating power continuously in an unsuitable condition.

The present invention has been made in consideration of the above problem, and therefore has an object to provide a fuel cell system capable of minimizing the deterioration of fuel cells caused by generating power continuously in an unsuitable condition.

In accomplishing the above object, a fuel cell system according to the present invention determines an operation mode of a fuel cell stack in accordance with a voltage rising condition thereof that is detected after the supply of reactant gas is started, and operates the fuel cell stack in the determined operation mode.

BEST MODE FOR CARRYING OUT THE INVENTION

Figure 1:
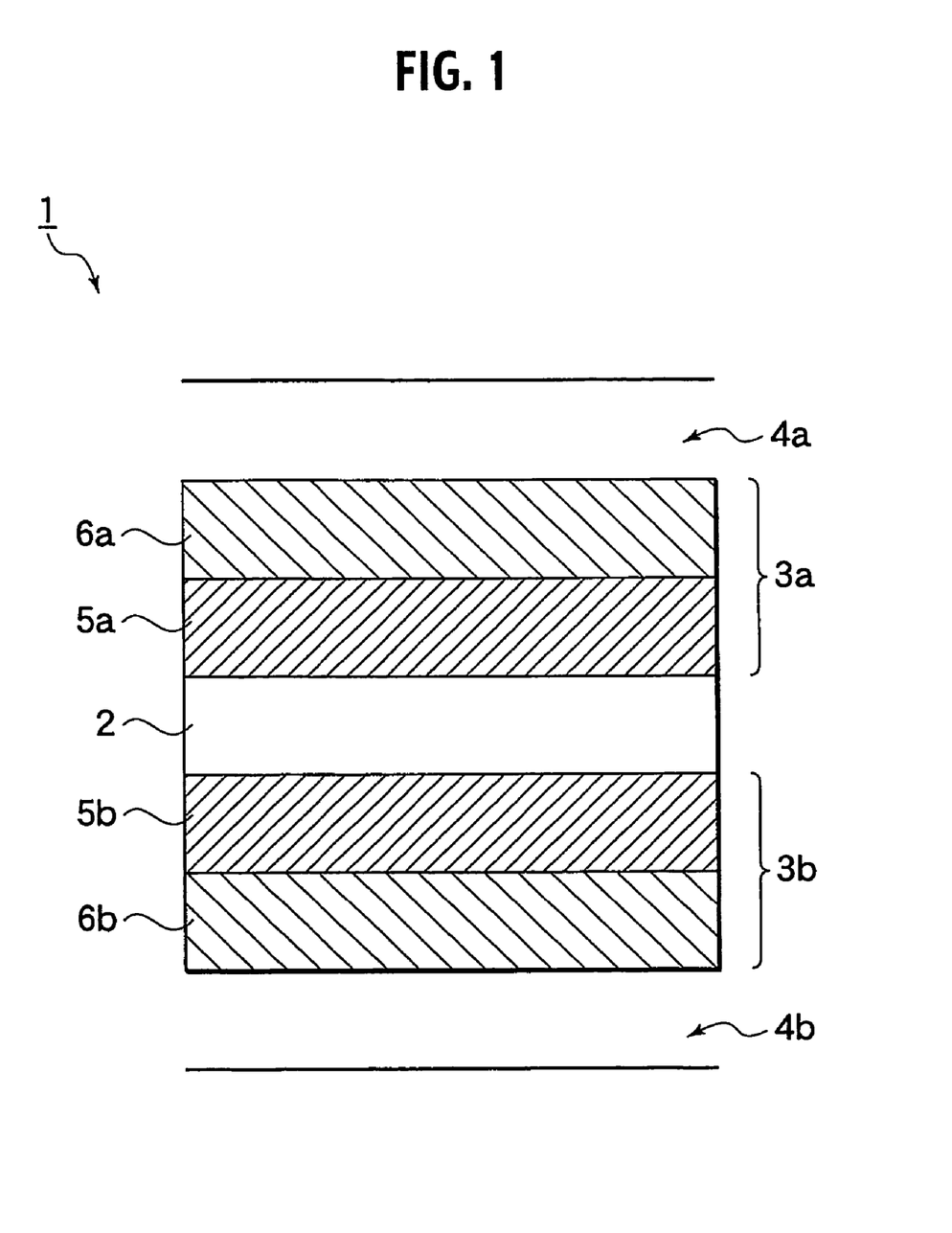
FIG. 1 is a cross section view showing a structure of a polymer electrolyte fuel cell according to one embodiment of the present invention.

A fuel cell system according to the present invention is applicable to a process of obtaining power by supplying reactant gas to a polymer electrolyte fuel cell (hereinafter, referred to simply as fuel cell) as shown in FIG. 1. A fuel cell 1 shown in FIG. 1 comprises an electrolyte membrane 2 made as a proton-conductive membrane from a solid polymeric material such as a fluorinated resin, a fuel electrode 3*a* and oxidant electrode 3*b* disposed to hold therebetween the electrolyte membrane 2, and gas flow channels 4*a* and 4*b*. The fuel electrode 3*a* and oxidant electrode 3*b* have catalyst layers 5*a* and 5*b*, respectively, which are formed on the side of electrolyte membrane 2 and are made from platinum only or a combination of platinum and other metals, and diffusion layers 6*a* and 6*b*, respectively, which are formed on the side of gas flow channels 4*a* and 4*b*. The gas flow channels 4*a* and 4*b* are formed of a number of ribs disposed on one or both sides of a gas impermeable, compact carbon material. A fuel gas and oxidant gas as reactant gas flow through the gas flow channels 4*a* and 4*b*, respectively, and are supplied from gas inlets and discharged from gas outlets of the gas flow channels 4*a* and 4*b*. In the thus constructed fuel cell 1, when hydrogen gas is supplied to the fuel electrode 3*a*, the electrochemical reaction described below proceeds in the fuel electrode 3*a*, whereupon a hydrogen ion is generated.

$$2H_2 \rightarrow 4H^+ 4e^-$$

The hydrogen ion generated by this electrochemical reaction permeates (diffuses through) the electrolyte membrane 2 in a hydrate state and reaches the oxidant electrode 3*b*, whereupon the electrochemical reaction described below proceeds in the oxidant electrode 3*b* if an oxygen-containing gas such as air is being supplied thereto. Consequently, the fuel cell 1 produces electromotive forces.

$$4H^+ 4e^- + O_2 \rightarrow H_2O$$

With reference to the accompanying drawings, detailed descriptions will be given of the configuration and operation of fuel cell systems according to first to seventh embodiments of the present invention.

First Embodiment
Configuration of Fuel Cell System

The configuration of a fuel cell system according to a first embodiment will be first described below with reference to FIG. 2.

Figure 2:
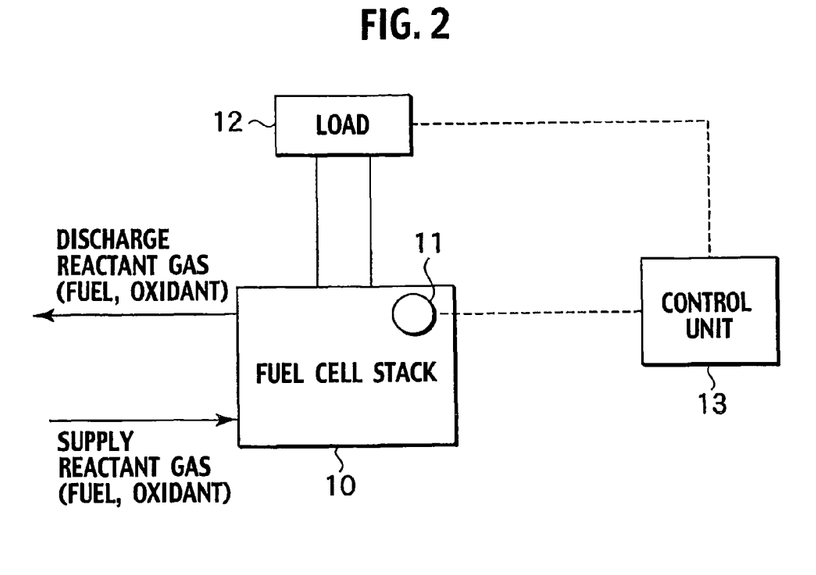
FIG. 2 is a block diagram showing a configuration of a fuel cell system according to a first embodiment of the present invention.

The fuel cell system according to the first embodiment of the present invention mainly comprises, as shown in FIG. 2, a fuel cell stack 10 formed by stacking a plurality of the aforementioned fuel cells 1, voltage rising detector 11 for detecting a rising condition of voltage of the fuel cell stack 10, a load 12 consuming power produced by the fuel cell stack 10, and a control unit 13 for controlling the fuel cell stack 10. The control unit 13 serves as control means according to the present invention.

Note here that in fuel cells, generally, not the whole energy of reactant gas is converted to an electromotive force, but the energy that has not been used as the electromotive force is dissipated as heat. In a fuel cell stack in which such fuel cells are stacked up, particularly immediately after a fuel cell system is start-up or when the outside atmosphere is of low temperature, most of the generated heat is dissipated from the both ends of the fuel cell stack into the outside atmosphere, while less heat is dissipated from the center portion of the fuel cell stack. Thus, the temperature distribution in a cell-stacking direction of the fuel cell stack exhibits low temperatures at the both ends and high temperatures in the center portion. Disadvantageously, this fuel cell stack is hence generally quite susceptible to freezing of fuel cells at or near the ends of the fuel cell stack. To overcome this problem, it is desirable for the aforementioned voltage rising detector 11 to detect a rise of voltage of the fuel cell stack 10 by measuring voltages or an average thereof, of at least a set of fuel cells 1 placed near the ends of the fuel cell stack 10.

Operation of Fuel Cell System

Figure 3:
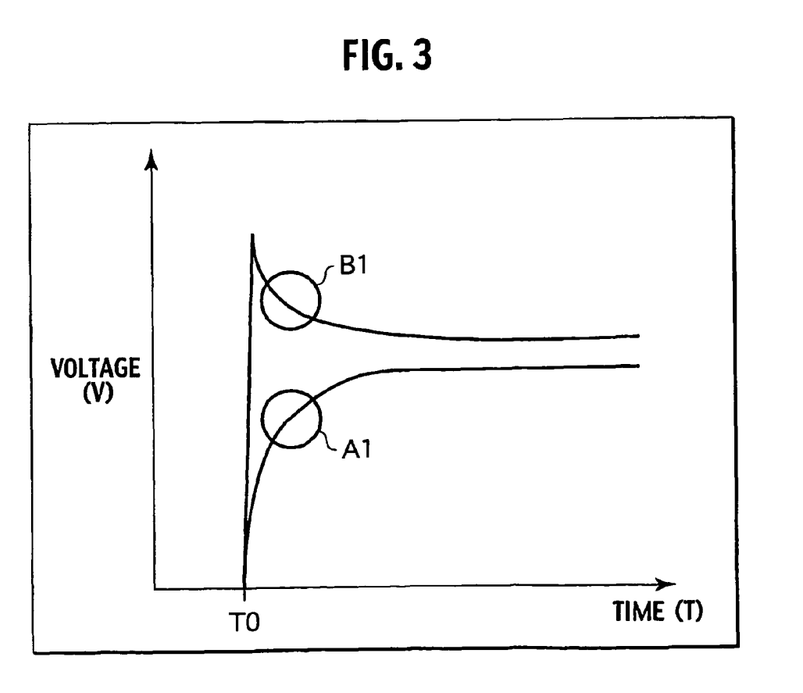
FIG. 3 is a diagram showing a rise in voltage of the fuel cell stack in FIG. 2.

In the thus configured fuel cell system, the control unit 13 decides an operation mode of the fuel cell stack 10 in accordance with a voltage rising condition, for example, as shown in FIG. 3, which is detected by the voltage rising detector 11, so as thereby to minimize deterioration of the fuel cell that is caused by generating power continuously in an unsuitable state upon start-up of the system in a low temperature environment below freezing.

More specifically, in the case where the supply of reactant gas to the fuel electrode 3a and oxidant electrode 3b is not obstructed, the voltage of the fuel cell stack 10 rises when the supply of reactant gas is started at a time T0 shown in FIG. 3. After that the voltage of the fuel cell stack 10 starts to decrease when the reaction gas permeates the electrolyte membrane 2 to directly cause a reaction at the opposite electrode. Thus, in this case, a differential coefficient of voltage with respect to time for the fuel cell stack 10 becomes negative as shown in an area A1 of FIG. 3.

On the other hand, in the case where the supply of reactant gas to the fuel electrode 3a and oxidant electrode 3b is obstructed, the voltage of the fuel cell stack 10 gradually rises because the reactant gas inevitably permeates a frozen layer to reach the fuel electrode 3a and oxidant electrode 3b. Thus, in this case, the time differential coefficient of voltage with respect to time for the fuel cell stack 10 becomes positive as shown in an area B1 in FIG. 3. Accordingly, in advance of obtaining current by applying a load to the fuel cell stack 10, the control unit 13 detects the internal state of the fuel cell stack 10 with reference to the differential coefficient of voltage with respect to time for the fuel cell stack 10, and then decides the level of load current to be derived from the fuel cell stack 10 based on the detected internal state.

Referring now to the flowchart in FIG. 4, the operation of the control unit 13 that is performed when the start-up process is activated, will be described below.

Figure 4:
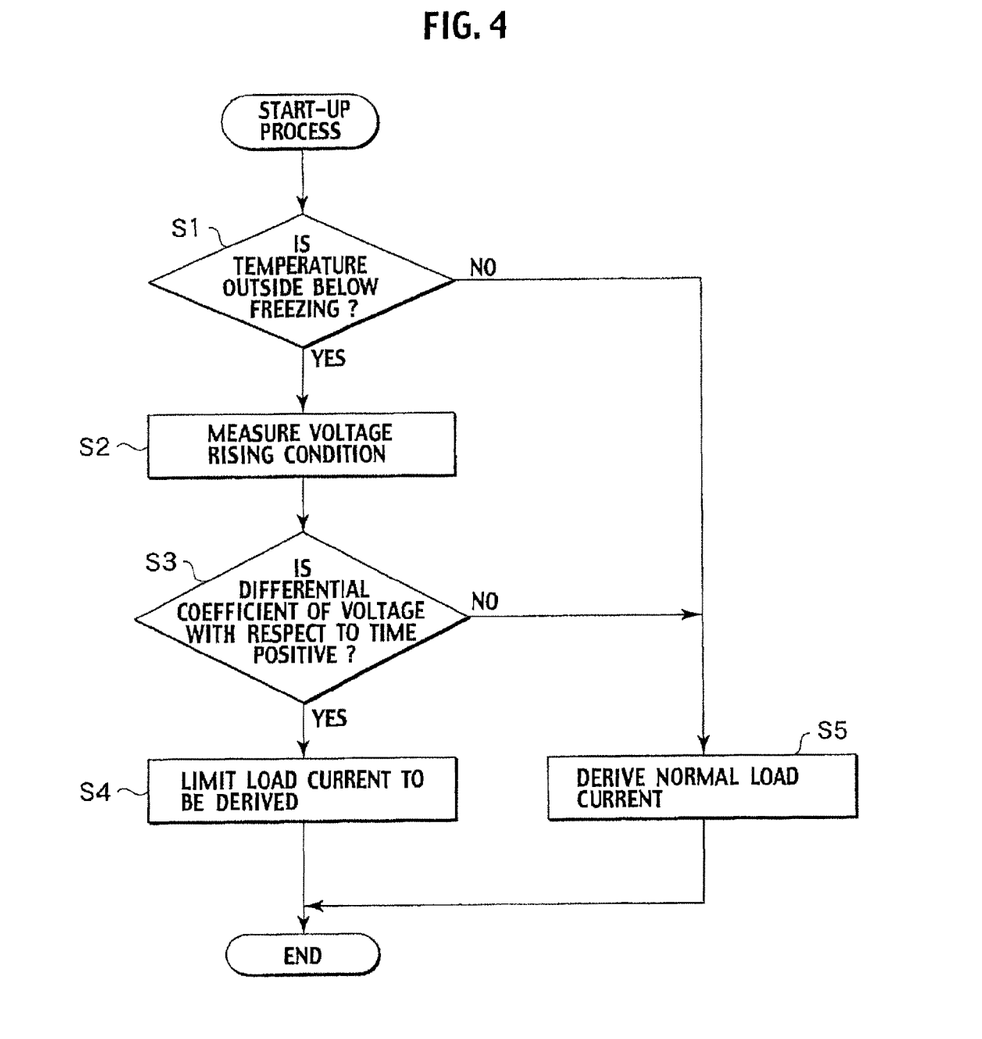
FIG. 4 is a flowchart diagram showing an activating process of the fuel cell system in FIG. 2.

The flowchart in FIG. 4 starts when a start-up instruction for the fuel cell stack 10 is inputted to the control unit 13, and the start-up process advances to step S1.

In step S1, the control unit 13 determines whether or not the outside temperature is below freezing, and when it is not below freezing, the control unit 13 advances this start-up process from step S1 to step S5. On the other hand, when the outside temperature is below freezing, the control unit 13 advances this start-up process from step S1 to step S2.

In step S2, the control unit 13 controls the voltage rising detector 11 to measure a voltage rising condition of the fuel cell stack 10, as shown in FIG. 3. This completes the processing in step S2, whereupon the start-up process proceeds from step S2 to step S3.

In step S3, the control unit 13 determines whether a differential coefficient of the measured voltage with respect to time is positive or negative. When the differential coefficient of the measured voltage with respect to time is not positive but negative, the control unit 13 advances the start-up process from step S3 to step S5. On the other hand, when the differential coefficient of the measured voltage with respect to time is positive, the control unit 13 advances the start-up process from step S3 to step S4.

In step S4, the control unit 13 determines that the fuel cell stack 10 is in a state inadequate to perform normal power generation, and then controls the fuel cell stack 10 so as to limit (lower) the level of load current obtained therefrom. A series of steps for the start-up process is now completed.

In step S5, the control unit 13 determines that the fuel cell stack 10 is sufficiently supplied with the reaction gas and hence it is in a state adequate to perform the normal power generation. Therefore, the control unit 13 controls the fuel cell stack 10 so as to obtain therefrom a normal level of current load. A series of steps for the start-up process is now completed.

As is clear from the above description, in the fuel cell system according to the first embodiment of the present invention, the control unit 13 determines the internal state of the fuel cell stack 10 based on the voltage rising condition of the fuel cell stack 10 that is detected after the supply of reactant gas is stared, and then decides a subsequent operation mode of the fuel cell stack 10 based on the determination, thereby making it possible to minimize deterioration of the fuel cell stack 10 caused by generating power continuously in an unsuitable condition.

Furthermore, in the fuel cell system according to the first embodiment of the present invention, the control unit 13 determines the state of the fuel cell stack 10 depending on whether the differential coefficient of voltage with respect to time is positive or negative, thereby allowing accurate determination of the internal state of the fuel cell stack 10.

Furthermore, in the fuel cell system according to the first embodiment of the present invention, when the differential coefficient of voltage with respect to time is positive, the control unit 13 determines that the supply of reaction gas to the fuel cell stack 10 is being obstructed and hence lowers the level of load current obtained from the fuel cell stack 10, which leads to less deterioration of the fuel cell stack 10.

Moreover, in the fuel cell system according to the first embodiment of the present invention, since the voltage rising detector 11 detects the voltage of the fuel cell stack 10 by measuring voltages of the fuel cells 1 at or near the ends of the fuel cell stack 10, it is possible to minimize deterioration of the fuel cells 1 located at positions most susceptible to deterioration.

Second Embodiment

Figure 5:
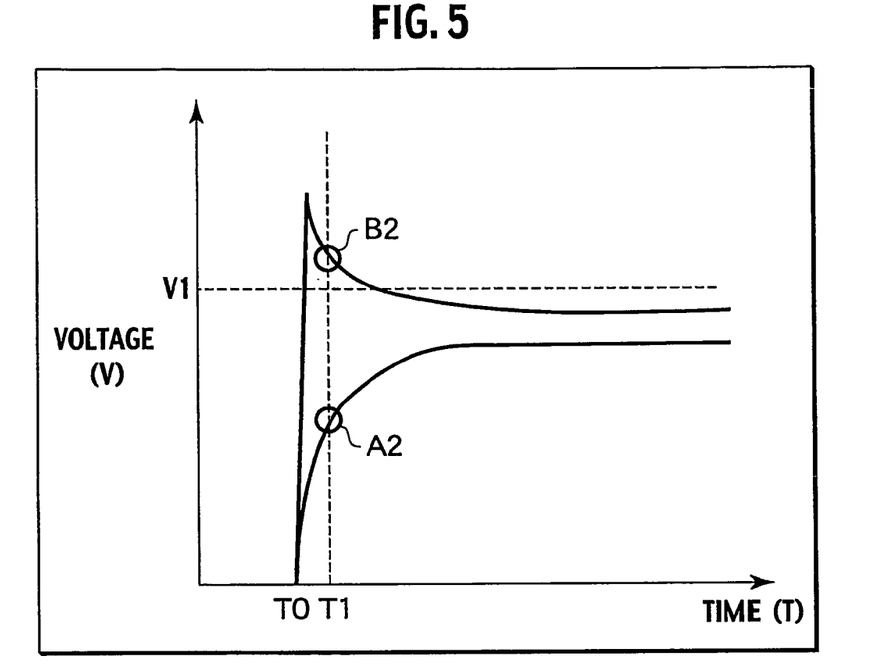
FIG. 5 is a diagram explaining an operation of a fuel cell system according to a second embodiment of the present invention.

Referring next to FIG. 5, the operation of a fuel cell system according to a second embodiment of the present invention will be described. It is noted here that the configuration of the fuel cell system according to the second embodiment is the same as that in the first embodiment, so the description thereof will be omitted.

In the fuel cell system according to the second embodiment of the present invention, the control unit 13 controls the voltage rising detector 11 to detect a voltage value of the fuel cell stack 10 at time T1 when a predetermined time period has elapsed from time T0 of starting the reactant gas supply, as shown in FIG. 5, and then decides a subsequent operation mode depending on whether the detected voltage value exceeds a threshold value V1. More specifically, when the voltage value detected after the elapse of the predetermined time period exceeds the threshold value V1 (area B2 shown in FIG. 5), the control unit 13 determines that the reaction gas is being supplied properly to the fuel electrode 3a and oxidant electrode 3b, and controls the fuel cell stack 10 so as to derive therefrom a normal level of load current. On the other hand, when the voltage value detected after the elapse of the predetermined time period does not exceed the threshold value V1 (area A2 shown in FIG. 5), the control unit 13 determines that the supply of reactant gas is being obstructed, and hence controls the fuel cell stack 10 so as to limit the level of load current to be derived therefrom.

As is clear from the above description, in the fuel cell system according to the second embodiment of the present invention, the control unit 13 detects the voltage value of the fuel cell stack 10 after the predetermined time period has elapsed since starting the supply of reactant gas, and determines the state of the fuel cell stack 10 depending on whether the detected voltage value exceeds the predetermined threshold value. Having this configuration allows for accurate determination of the state of the fuel cell stack 10 because the voltage of the fuel cell stack 10 typically goes up once and then down when being appropriately supplied with the reactant gas. In addition, the control unit 13 decides a subsequent operation mode of the fuel cell stack 10 based on the determined state, which makes it possible to minimize deterioration of the fuel cell stack 10 resulting from continuous power generation in an unsuitable condition.

Furthermore, in the fuel cell system according to the second embodiment of the present invention, when the voltage value detected after the elapse of the predetermined time period from staring the supply of reactant gas does not exceed the threshold value, the control unit 13 determines that the supply of reactant gas to the fuel cell stack 10 is being obstructed and hence lowers the load current to be obtained from the fuel cell stack 10, thereby resulting in reduced deterioration of the fuel cell stack 10.

Third Embodiment

Figure 6:
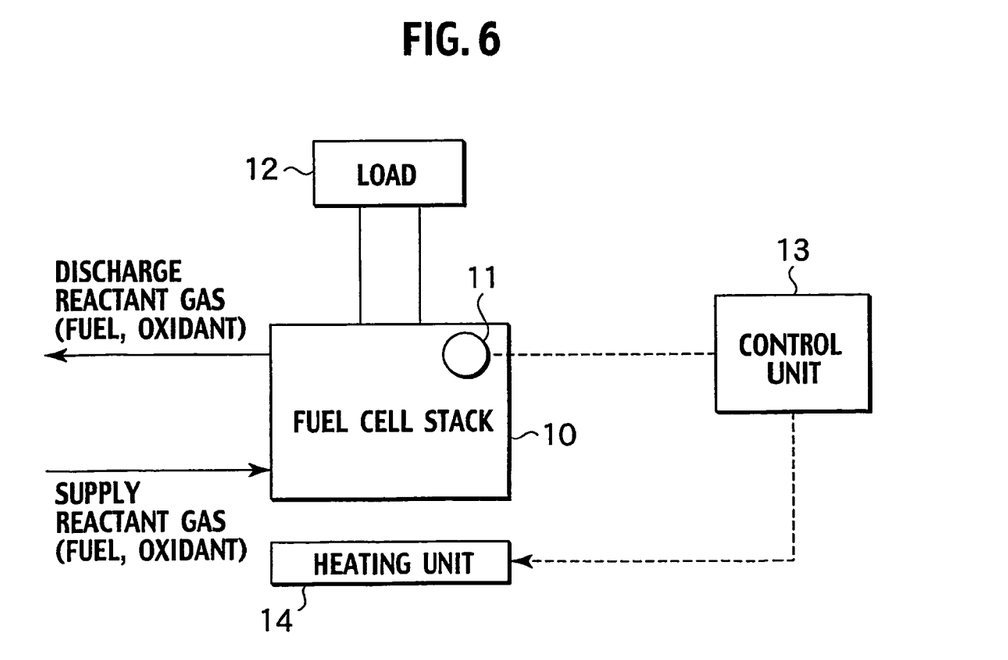
FIG. 6 is a block diagram showing a configuration of a fuel cell system according to a third embodiment of the present invention.

Referring next to FIG. 6, the configuration and operation of a fuel cell system according to a third embodiment of the present invention will be described below.

As shown in FIG. 6, the fuel cell system according to the third embodiment of the present invention has the configuration of the fuel cell system according to the aforementioned fast or second embodiment of the present invention, and additionally comprises a heating unit 14, such as an electric heater or combustion equipment using an inflammable gas, for heating up the fuel cell stack 10. The heating unit 14 serves as stack heating means according to the present invention.

In the thus configured fuel cell system, when the control unit 13 determines that the fuel cell stack 10 is in a state adequate for normal power generation, the control unit 13 does not activate the heating unit 14 or reduces the power consumed in the heating unit 14 by lowering a heating value of the heating unit 14, so that the efficiency of the entire fuel cell system is enhanced.

When the control unit 13 determines that the fuel cell stack 10 is in a state inadequate for normal power generation, the control unit 13 activates the heating unit 14 or increases the heating value of the beating unit 14 so that the temperature of the fuel cell stack 10 rapidly rises, in order to prevent the deterioration of the fuel cell stack 10.

As is clear from the above, the fuel cell system according to the third embodiment of the present invention comprises the heating unit 14 for raising the temperature of the fuel cell stack 10, wherein the control unit 13 controls the heating value of the heating unit 14 in accordance with the internal state of the fuel cell stack 10. This makes it possible to minimize deterioration of the fuel cell stack 10 due to continuous power generation in an unsuitable state.

In addition, in the fuel cell system according to the third embodiment of the present invention, when it is determined that the fuel cell stack 10 is in the state inadequate for normal power generation because the differential coefficient of voltage with respect to time is positive or because the voltage detected after the elapse of the predetermined time period from staring the supply of reactant gas does not exceed the threshold value, the control unit 13 serves to rapidly raise the temperature of the fuel cell stack 10 by the use of the heating unit 14 or by increasing the heating value thereof, which thereby leads to minimized deterioration of the fuel cell stack 10.

Fourth Embodiment

Figure 7:
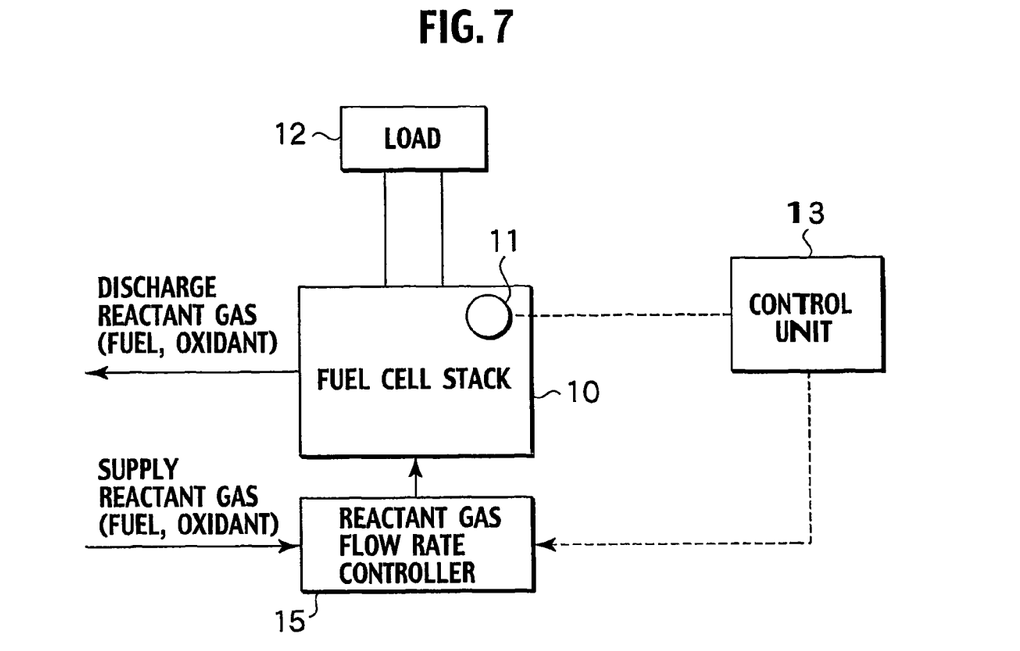
FIG. 7 is a block diagram showing a configuration of a fuel cell system according to a fourth embodiment of the present invention.

Referring next to FIG. 7, a description will be given of the configuration and operation of a fuel cell system according to a fourth embodiment of the present invention.

As shown in FIG. 7, the fuel cell system according to the fourth embodiment of the present invention has the configuration of the fuel cell system in the aforementioned first or second embodiment, and additionally comprises a reactant gas flow rate controller 15 for controlling a flow rate of reactant gas supplied to the fuel cell stack 10. Note here that the reactant gas controlled by the reactant gas flow rate controller 15 may be either a fuel gas or an oxidant gas, or the both thereof.

In the thus configured fuel cell system, when the control unit 13 determines that the fuel cell stack 10 is in the state adequate for normal power generation, the control unit 13 controls the reactant gas flow rate controller 15 thereby to supply the fuel cell stack 10 with the reactant gas at a flow rate consistent with a normal stating process.

When the control unit 13 determines that the fuel cell stack 10 is in the state inadequate for normal power generation, the control unit 13 controls the reactant gas flow rate controller 15 thereby to supply the fuel cell stack 10 with the reactant gas at a flow rate higher than that in the normal starting process.

As is clear from the above, the fuel cell system according to the fourth embodiment of the present invention comprises the reactant gas flow rate controller 15 for controlling the flow rate of the reactant gas supplied to the fuel cell stack 10, wherein the control unit 13 controls the reactant gas flow rate supplied to the fuel cell stack 10 in accordance with the state of the fuel cell stack 10, thus making it possible to minimize deterioration of the fuel cell stack 10 that is caused by generating power continuously in an unsuitable state.

Moreover, in the fuel cell system according to the fourth embodiment of the present invention, when it is determined that the fuel cell stack 10 is in the state inadequate for normal power generation because the differential coefficient of voltage with respect to time is positive or because the voltage detected after the elapse of the predetermined time period from staring the supply of reactant gas does not exceed the threshold value, the control unit 13 serves to supply the fuel cell stack 10 with the reactant gas at a flow rate higher than that in the normal staring process. This results in a substantial reduction in deterioration of the fuel cell stack 10.

Fifth Embodiment

Figure 8:
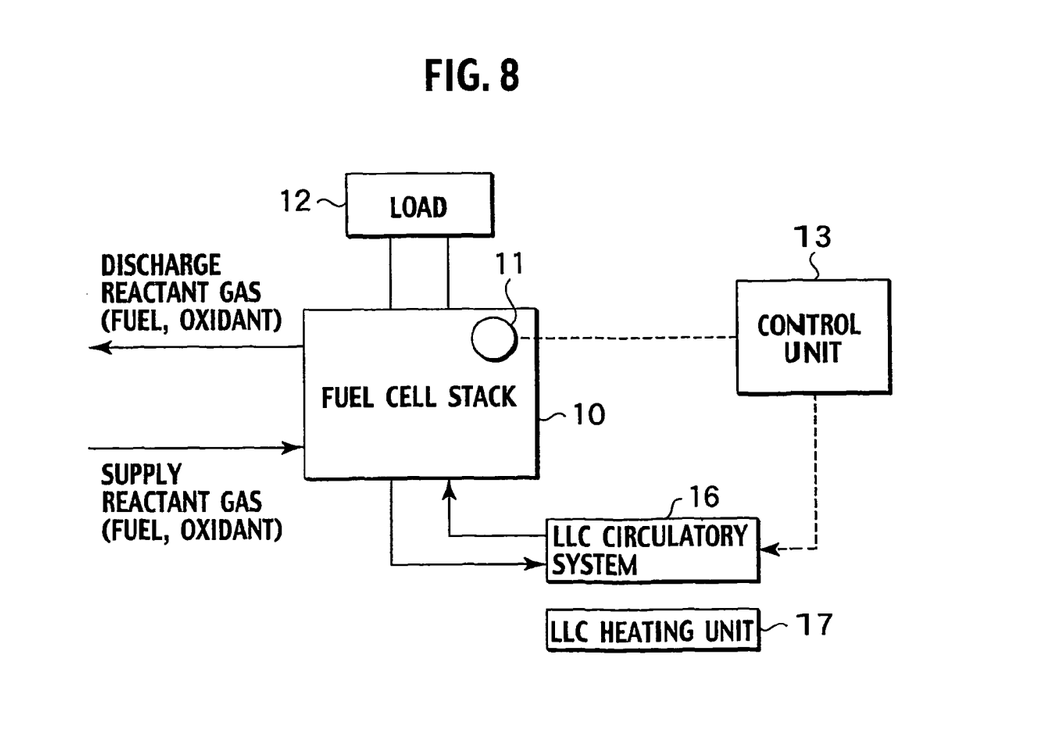
FIG. 8 is a block diagram showing a configuration of a fuel cell system according to a fifth embodiment of the present invention.

Referring now to FIG. 8, the configuration and operation of a fuel cell system according to a fifth embodiment of the present invention will be described below.

As shown in FIG. 8, the fuel cell system according to the fifth embodiment of the present invention has the configuration of the fuel cell system in the aforementioned first or second embodiment, and additionally comprises an LLC (LongLife Coolant) circulatory system 16 for controlling the temperature of the fuel cell stack 10 by circulating an LLC as a heating medium through the fuel cell stack 10, and an LLC heating unit 17, such as an electric heater, for heating the LLC. The LLC heating unit 17 serves as medium heating means according to the present invention.

In thus configured fuel cell system, when the control unit 13 determines that the fuel cell stack 10 is in the state inadequate for normal power generation, the control unit 13 controls the LLC circulatory system 16 to increase the LLC flow rate so that the temperature of the fuel cell stack 10 is immediately raised. In this embodiment, while the flow rate of LLC as a heating medium is increased to heat the fuel cell stack 10, it is possible to use the LLC as a cooling medium by decreasing the flow rate of LLC. In this case, the start-up of the fuel cell stack 10 can be achieved in smooth operation conditions.

As is clear from the above description, the fuel cell system according to the fifth embodiment of the present invention comprises the LL1 circulatory system 16 for circulating a heating medium through the fuel cell stack 10, wherein the control unit 13 controls a flow rate of the heating medium in accordance with the state of the fuel cell stack 10, thereby making it possible to m deterioration of the fuel cell stack 10 caused by generating power continuously in an unsuitable state.

In addition, in the fuel cell system according to the fifth embodiment of the present invention, when it is determined that the fuel cell stack 10 is in the state inadequate for normal power generation because the differential coefficient of voltage with respect to time is positive or because the voltage detected after the elapse of the predetermined time period from starting the supply of reactant gas does not exceed the threshold value, the control unit 13 serves to circulate the LLC at a flow rate higher than that in the normal staring process through the fuel cell stack 10, which leads to less deterioration of the fuel cell stack 10.

Sixth Embodiment

Figure 9:
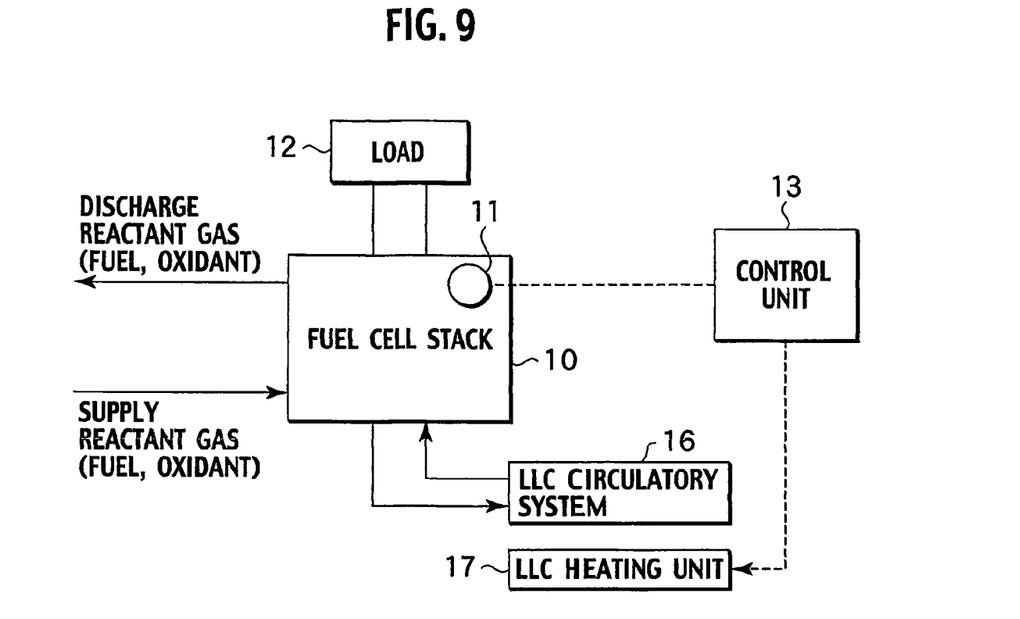
FIG. 9 is a block diagram showing a configuration of a fuel cell system according to a sixth embodiment of the present invention.

Referring next to FIG. 9, a description will be given of the operation of a fuel cell system according to a sixth embodiment of the present invention. The configuration of the fuel cell system in the sixth embodiment is the same as that in the fifth embodiment, so the description thereof will be omitted.

In the fuel cell system in the sixth embodiment of the present invention, when the control unit 13 determines that the fuel cell stack 10 is in the state inadequate for normal power generation, the control unit 13 controls the LLC heating unit 17 to heat the LLC so that the temperature of the fuel cell stack 10 rises quickly.

As is clear from the above, the fuel cell system in the sixth embodiment of the present invention comprises the LLC heating unit 17 for increasing the temperature of a heating medium that circulates through the fuel cell stack 10, wherein the control unit 13 controls the temperature of the heating medium circulating through the fuel cell stack 10 in accordance with the state thereof, which makes it possible to minimize deterioration of the fuel cell stack 10 caused by generating power continuously in an unsuitable state.

Furthermore, in the fuel cell system according to the sixth embodiment of the present invention, when it is determined that the fuel cell stack 10 is in the state inadequate for normal power generation because the differential coefficient of voltage with respect to time is positive or because the voltage detected after the predetermined time period has elapsed since starting the supply of reactant gas does not exceed the threshold value, the control unit 13 serves to circulate the LLC at a temperature higher than that in the normal starting process, thereby leading to less deterioration of the fuel cell stack 10.

Seventh Embodiment

Figure 10:
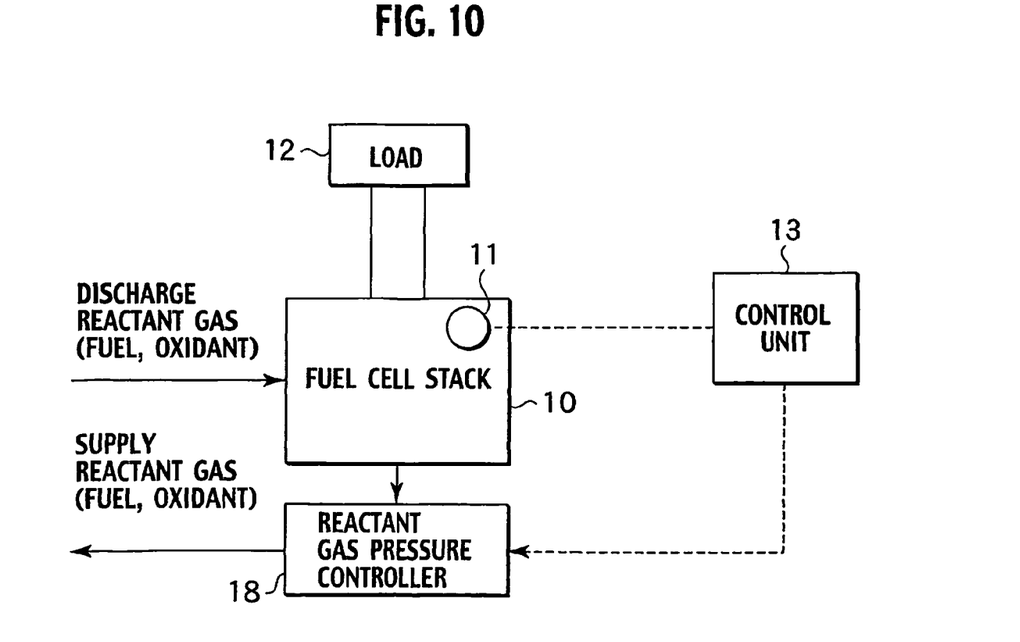
FIG. 10 is a block diagram showing a configuration of a fuel cell system according to a seventh embodiment of the present invention.

Referring next to FIG. 10, the configuration and operation of a fuel cell system according to a seventh embodiment of the present invention will be described below.

As shown in FIG. 10, the fuel cell system according to the seventh embodiment of the present invention has the configuration of the fuel cell system according to the first or second embodiment, and additionally comprises a reactant gas pressure controller 18 for controlling the pressure of reactant gas supplied to the fuel cell stack 10.

In the thus configured fuel cell system, when the control unit 13 determines that the fuel cell stack 10 is in the state inadequate for normal power generation, the control unit 13 controls the reactant gas pressure controller 18 to supply the fuel cell stack 10 with the reactant gas at a pressure higher than that in normal starting process.

As is clear from the above, the fuel cell system according to the seventh embodiment comprises the reactant gas pressure controller 18 for controlling the pressure of reactant gas supplied to the fuel cell stack 10, wherein the control unit 13 controls the pressure of the reactant gas supplied to the fuel cell stack 10 in accordance with the state thereof, which makes it possible to minimize deterioration of the fuel cell stack 10 caused by generating power continuously in an unsuitable state.

Furthermore, in the fuel cell system according to the seventh embodiment of the present invention, when it is determined that the fuel cell stack 10 is in the state inadequate for normal power generation because the differential coefficient of voltage with respect to time is positive or because the voltage detected after the elapse of the predetermined time period since starting the supply of reactant gas does not exceed the threshold value, the control unit 13 serves to supply the fuel cell stack 10 with the reactant gas at a pressure higher than that in normal starting process, thereby leading to less deterioration of the fuel cell stack 10.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of a Patent Application No. TOKUGAN 2003-389286 with a filing date of Nov. 19, 2003, is hereby incorporated by reference.

Industrial Applicability

The present invention is applicable to a process of generating power by supplying a fuel gas and an oxidant gas to a fuel cell stack thereby to drive a vehicle driving motor.

The invention claimed is:

1. A fuel cell system comprising:
a fuel cell stack formed by stacking a plurality of fuel cells for generating power through an electrochemical reaction utilizing reactant gas,
wherein an operation mode of the fuel cell stack is determined based on a voltage rising condition of the fuel cell stack that is detected after supply of the reactant gas is started, and
wherein the voltage rising condition is determined based on a differential coefficient of a voltage value of the fuel cell stack with respect to time upon starting the fuel cell stack in a low temperature environment in advance of obtaining current by applying a load to the fuel cell stack.

2. A fuel cell system comprising:
a fuel cell stack formed by stacking a plurality of fuel cells for generating power through an electrochemical reaction utilizing reactant gas;
voltage rising detection means for detecting a voltage rising condition of the fuel cell stack after supply of the reactant gas is started, wherein the voltage rising detection means is configured to determine the voltage rising condition based on a differential coefficient of a voltage value of the fuel cell stack with respect to time upon starting the fuel cell stack in a low temperature environment in advance of obtaining current by applying a load to the fuel cell stack; and
control means for determining an operation mode in accordance with the voltage rising condition detected by the voltage rising detection means and operating the fuel cell stack in the determined operation mode.

3. A fuel cell system comprising:
a fuel cell stack formed by stacking a plurality of fuel cells configured to generate power through an electrochemical reaction utilizing reactant gas;
a voltage rising detector configured to detect a voltage rising condition of the fuel cell stack after supply of the reactant gas is started, wherein the voltage rising detector is configured to determine the voltage rising condition based on a differential coefficient of a voltage value of the fuel cell stack with respect to time upon starting the fuel cell stack in a low temperature environment in advance of obtaining current by applying a load to the fuel cell stack; and
a control unit configured to determine an operation mode in accordance with the voltage rising condition detected by the voltage rising detector and configured to operate the fuel cell stack in the determined operation mode.

4. The fuel cell system according to claim 3, wherein the voltage rising detector is configured to determine the voltage rising condition by determining whether the differential coefficient of the voltage value of the fuel cell stack with respect to time is positive or negative.

5. The fuel cell system according to claim 3, wherein the voltage rising detector is configured to determine the voltage rising condition by determining whether or not a voltage value detected after a predetermined time period has elapsed from starting the supply of the reactant gas exceeds a predetermined threshold value.

6. The fuel cell system according to claim 3, wherein the control unit is configured to vary a value of load current obtained from the fuel cell stack in accordance with the voltage rising condition detected by the voltage rising detector.

7. The fuel cell system according to claim 6, wherein the control unit is configured to reduce the value of load current obtained from the fuel cell stack to less than that for a normal operation when the differential coefficient is positive.

8. The fuel cell system according to claim 6, wherein the control unit is configured to reduce the value of load current obtained from the fuel cell stack to less than that for a normal operation when a voltage value detected after an elapse of a predetermined time period does not exceed a threshold value.

9. The fuel cell system according to claim 3, further comprising a stack heating unit configured to heat the fuel cell stack,
wherein the control unit is configured to vary a heating value of the stack heating unit in accordance with the voltage rising condition detected by the voltage rising detector.

10. The fuel cell system according to claim 9, wherein the control unit is configured to increase the heating value of the stack heating unit to more than that for a normal operation when the differential coefficient is positive.

11. The fuel cell system according to claim 9, wherein the control unit is configured to increase the heating value of the stack heating unit to more than that for a normal operation when a voltage value detected after an elapse of a predetermined time period does not exceed a threshold value.

12. The fuel cell system according to claim 3, further comprising a reactant gas flow rate control unit configured to control a flow rate of the reactant gas supplied to the fuel cell stack,
wherein the control unit is configured to vary the flow rate of the reactant gas supplied to the fuel cell stack by controlling the reactant gas flow rate control unit, in accordance with the voltage rising condition detected by the voltage rising detector.

13. The fuel cell system according to claim 12, wherein the control unit is configured to increase the flow rate of the reactant gas to more than that for a normal operation when the differential coefficient is positive.

14. The fuel cell system according to claim 12, wherein the control unit is configured to increase the flow rate of the reactant gas to more than that for a normal operation when a voltage value detected after an elapse of a predetermined time period does not exceed a threshold value.

15. The fuel cell system according to claim 3, further comprising a circulatory unit configured to circulate a heating medium through the fuel cell stack,
wherein the control unit is configured to vary a flow rate of the heating medium in accordance with the voltage rising condition detected by the voltage rising detector.

16. The fuel cell system according to claim 15, wherein the control unit is configured to increase the flow rate of the heating medium to more than that for a normal operation when the differential coefficient is positive.

17. The fuel cell system according to claim 15, wherein the control unit is configured to increase the flow rate of the heating medium to more than that for a normal operation when a voltage value detected after an elapse of a predetermined time period does not exceed a threshold value.

18. The fuel cell system according to claim 3, further comprising:
a circulatory unit configured to circulate a heating medium through the fuel cell stack; and
a medium heating unit configured to heat the heating medium, wherein the control unit is configured to vary a temperature of the heating medium in accordance with the voltage rising condition detected by the voltage rising detector.

19. The fuel cell system according to claim 18, wherein the control unit is configured to raise the temperature of the heating medium to higher than that for a normal operation when the differential coefficient is positive.

20. The fuel cell system according to claim 18, wherein the control unit is configured to raise the temperature of the heating medium to higher than that for a normal operation when a voltage value detected after an elapse of a predetermined time period does not exceed a threshold value.

21. The fuel cell system according to claim 3, further comprising a reactant gas pressure control unit configured to control pressure of the reactant gas supplied to the fuel cell stack,
wherein the control unit is configured to vary the pressure of the reactant gas supplied to the fuel cell stack by controlling the reactant gas pressure control unit, in accordance with the voltage rising condition detected by the voltage rising detector.

22. The fuel cell system according to claim 21, wherein the control unit is configured to increase the pressure of the reactant gas to higher than that for a normal operation when the differential coefficient is positive.

23. The fuel cell system according to claim 21, wherein the control unit is configured to increase the pressure of the reactant gas to higher than that for a normal operation when a voltage value detected after an elapse of a predetermined time period does not exceed a threshold value.

24. The fuel cell system according to claim 3, wherein the voltage rising detector is configured to detect the voltage rising condition by measuring voltages or an average thereof, of at least a set of fuel cells placed near ends of the fuel cell stack.

25. The fuel cell system according to claim 3, wherein, upon starting the fuel cell stack below freezing, the control unit is configured to determine the operation mode of the fuel cell stack in accordance with the voltage rising condition detected by the voltage rising detector and is configured to operate the fuel cell stack in the determined operation mode.

26. The fuel cell system according to claim 3, wherein the control unit is configured to determine the operation mode of the fuel cell stack in accordance with the voltage rising condition detected by the voltage rising detector and upon a determination of whether an outside temperature is below a freezing temperature of water, and wherein the control unit is configured to operate the fuel cell stack in the determined operation mode.

* * * * *